(12) United States Patent
Kurian

(10) Patent No.: US 11,127,092 B2
(45) Date of Patent: Sep. 21, 2021

(54) METHOD AND SYSTEM FOR DATA TRACKING AND EXCHANGE

(71) Applicant: Bank of America Corporation, Charlotte, NC (US)

(72) Inventor: Manu Jacob Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 428 days.

(21) Appl. No.: 15/598,835

(22) Filed: May 18, 2017

(65) Prior Publication Data

US 2018/0336646 A1    Nov. 22, 2018

(51) Int. Cl.
*G06Q 50/04* (2012.01)
*G06Q 10/08* (2012.01)

(52) U.S. Cl.
CPC ........... *G06Q 50/04* (2013.01); *G06Q 10/087* (2013.01)

(58) Field of Classification Search
CPC ...... G06Q 50/04; G06Q 10/087; G06Q 10/10; G06Q 50/188
USPC .......... 705/28, 39, 44, 50, 21; 709/206, 217, 709/219
See application file for complete search history.

(56) References Cited

U.S. PATENT DOCUMENTS

| | | | |
|---|---|---|---|
| 7,593,898 B1 | 9/2009 | Tsuei et al. | |
| 7,636,696 B1 | 12/2009 | Sigler, Jr. et al. | |
| 7,765,148 B2 | 7/2010 | German et al. | |
| 8,271,394 B1 | 9/2012 | Bogaard | |
| 8,429,084 B1 | 4/2013 | Bogaard | |
| 9,235,857 B2 | 1/2016 | Bogaard | |
| 10,366,383 B2* | 7/2019 | Glashan | G06Q 20/327 |
| 2001/0010044 A1* | 7/2001 | Aieta | H04L 63/126 705/50 |
| 2004/0087339 A1* | 5/2004 | Goldthwaite | G06Q 20/10 455/558 |
| 2005/0234641 A1* | 10/2005 | Marks | G06Q 10/08 701/484 |
| 2012/0271742 A1* | 10/2012 | Solomon | B65G 1/127 705/28 |
| 2013/0024232 A1 | 1/2013 | Powell | |
| 2013/0036050 A1* | 2/2013 | Giordano | G06Q 20/22 705/44 |

(Continued)

*Primary Examiner* — Vanel Frenel
(74) *Attorney, Agent, or Firm* — Banner & Witcott, Ltd.; Michael A. Springs

(57) ABSTRACT

Aspects of the present disclosure are directed to electronic computer implemented tracking method and system for an article of manufacture. In one aspect, a plurality of computer readable records are electronically maintained and stored in a computer readable database. In one step, a temporary virtual record is generated with EDI data payload including a transaction record attribute, a location transfer request attribute for designating a transfer location of an article of manufacture, and a recipient user biometric ID attribute. Next, electronically via data communications network tunnel, EDI data payload representative of the transaction record attribute and the location transfer request attribute is transmitted; and responsive to the location transfer request attribute, via the computer-based data communications network, the system transmits EDI data payload representative of an exchange zone attribute for designating a physical zone for exchanging said article of manufacture.

6 Claims, 9 Drawing Sheets

(56) References Cited

U.S. PATENT DOCUMENTS

2013/0163510 A1* 6/2013 Chakravarthy ....... H04L 1/1685
                                                  370/328
2013/0262330 A1* 10/2013 Sannier .............. G06Q 30/0185
                                                  705/318
2016/0180618 A1* 6/2016 Ho .................... G07C 9/00563
                                                  340/5.52

* cited by examiner

METHOD AND SYSTEM FOR DATA TRACKING AND EXCHANGE

BACKGROUND

Moore's law predicted that the number of transistors on a computer chip would double every two years while the chip's price would remain constant. "Moore's law" meant consumers could buy the same technology two years later for about the same price. Fifty years later, Moore's law prediction has endured to the idea that technology companies have recognized Moore's law as a benchmark they must meet, or fall behind in the market. Patrons have come to expect technological products to be faster, cheaper, and more compact over time. This expectation seems to have driven trends of rapid growth in computing power, smaller devices, the ability to connect to the Internet, and reduction in cost and big data. There is a need to improve the technological processing in the new computing era.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the present disclosure are directed to electronic computer implemented tracking method and system for an article of manufacture. In one aspect, a plurality of computer readable records are electronically maintained and stored in a computer readable database. In a step, a temporary virtual record is generated with EDI data payload including a transaction record attribute, a location transfer request attribute for designating a transfer location of an article of manufacture, and a recipient user biometric ID attribute. Next, electronically via data communications network tunnel, EDI data payload representative of the transaction record attribute and the location transfer request attribute is transmitted; and responsive to the location transfer request attribute, via the computer-based data communications network, the system transmits EDI data payload representative of an exchange zone attribute for designating a physical zone for exchanging said article of manufacture. In yet other aspects, EDI data payload representative an exchange sub-zone attribute associated with the transaction record attribute is transmitted via the computer-based data communications network. In yet further aspects, EDI data payload representative of a sender user biometric ID attribute is transmitted via the computer-based data communications network.

Aspects of the present disclosure are directed to electronic computer implemented tracking method and system for a product. One or more non-transitory computer readable media storing computer executable instructions that, when executed by at least one processor, cause the at least one processor to perform a digital tracking method, comprise: electronically maintaining a plurality of computer readable records in an computer readable database. A temporary virtual record is generated with EDI data payload including a transaction record attribute, a location transfer request attribute for designating a transfer location of an article of manufacture, and a recipient user biometric ID attribute. Next the processor electronically via data communications network tunnel, transmits EDI data payload representative of the transaction record attribute and the location transfer request attribute. And responsive to the location transfer request attribute, via the computer-based data communications network, the system transmits EDI data payload representative of an exchange zone attribute for designating a physical zone for exchanging said article of manufacture. Systems and methods for biometrically identifying an individual for exchanging an article of manufacture without a need for the individual to input authentication data into a system/device are also described.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
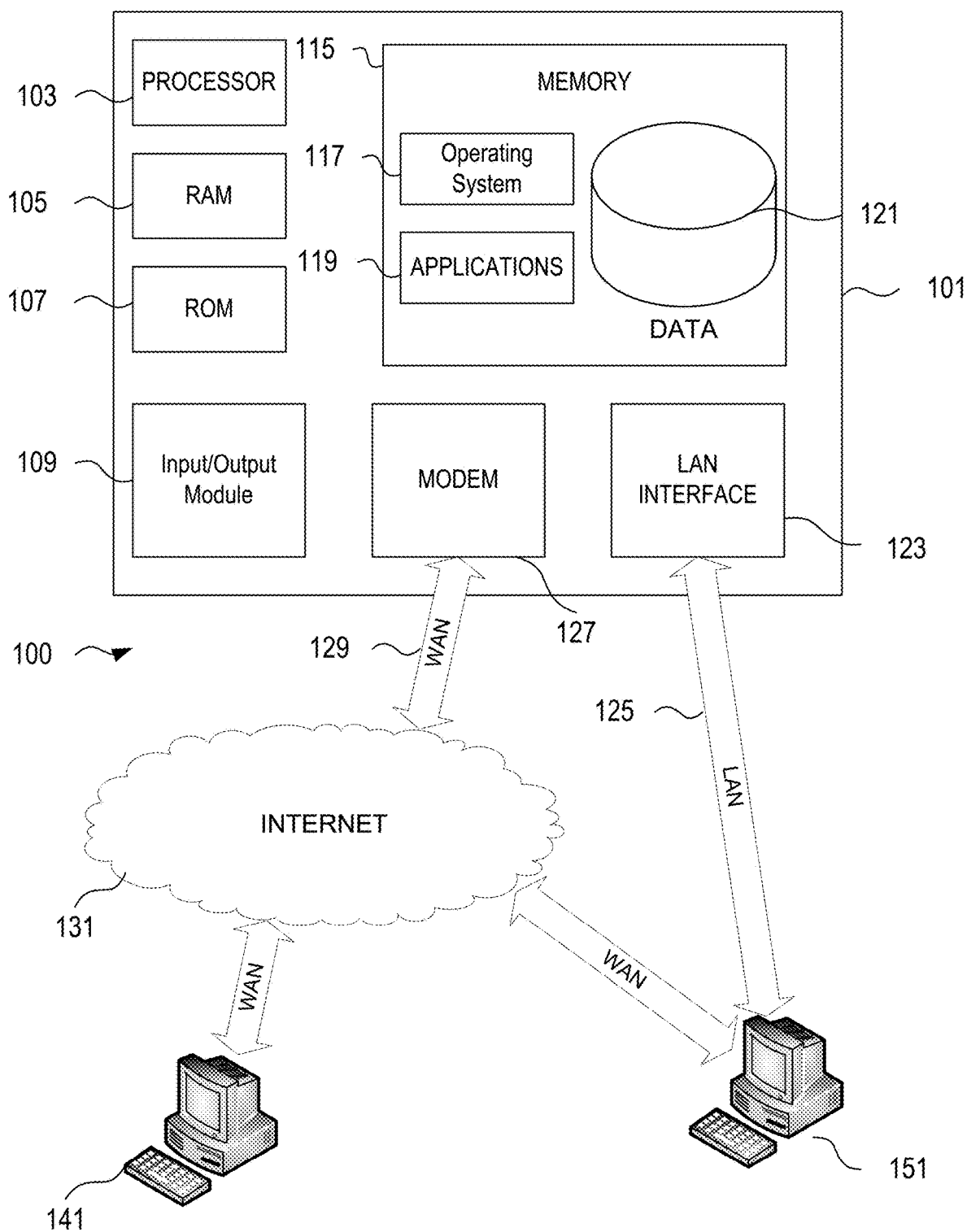
FIG. 1 illustrates a schematic diagram of a digital computing environment in which certain aspects of the present disclosure may be implemented.

FIG. 1 illustrates a block diagram of an specific programmed computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/ or graphical output. Other I/O devices through which a user and/or other device may provide input to device 101 also may be included. Software may be stored within memory 115 and/or storage to provide computer readable instructions to processor 103 for enabling server 101 to perform various technologic functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with vendors and patrons, allowing functional interoperability between different elements located at multiple physical locations.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, mobile computing devices, e.g., smart phones, wearable computing devices, tablets, distributed computing environments that include any of the above systems or devices, and the like.

The disclosure may be described in the context of computer-executable instructions, such as program modules, being executed by a computer. Generally, program modules include routines, programs, objects, components, data structures, etc. that perform particular tasks or implement particular computer data types. The disclosure may also be practiced in distributed computing environments where tasks are performed by remote processing devices that are linked through a communications network. In a distributed computing environment, program modules may be located in both local and remote computer storage media including memory storage devices.

Figure 2:
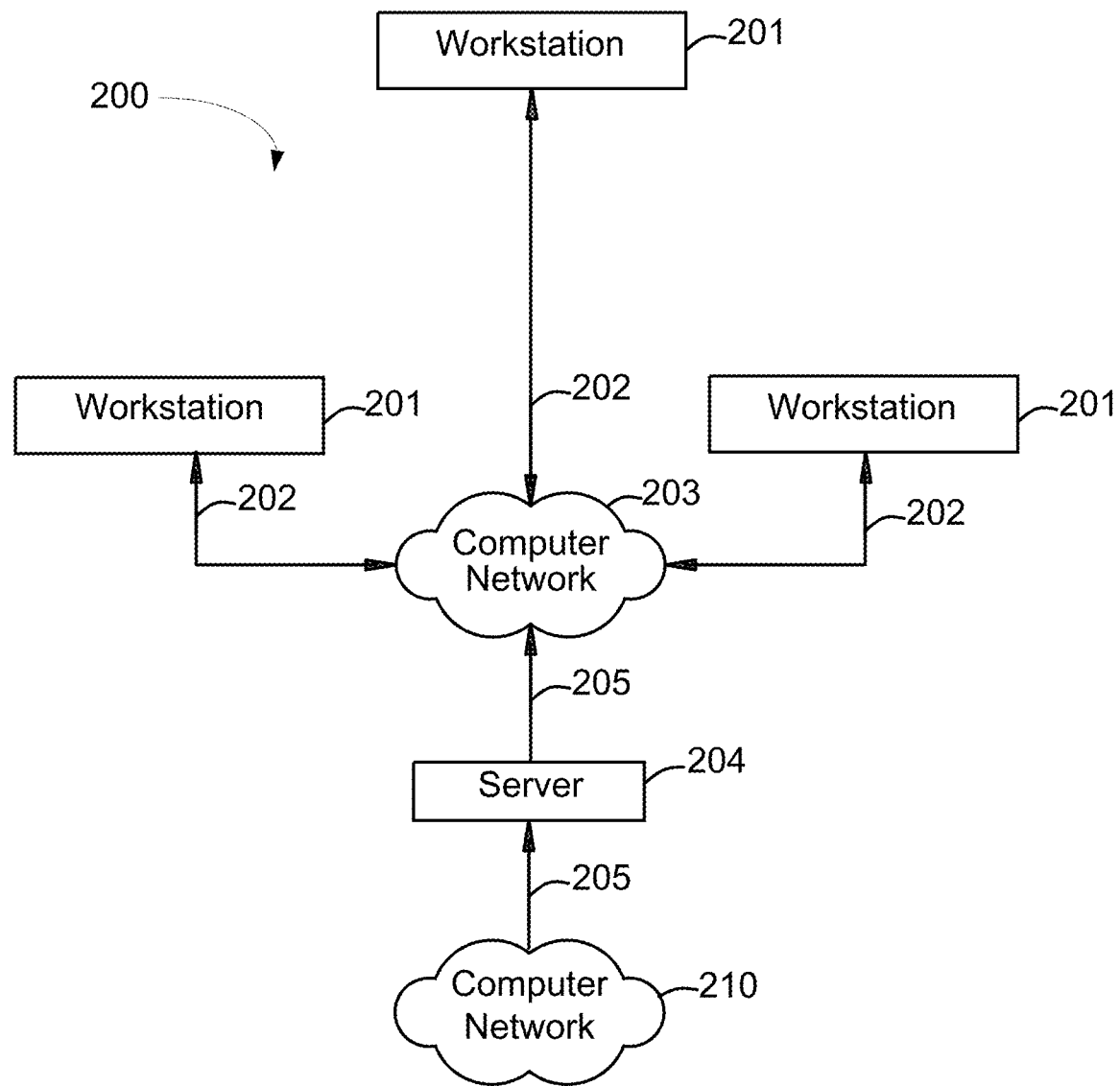
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer network 203 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

Figure 3A:
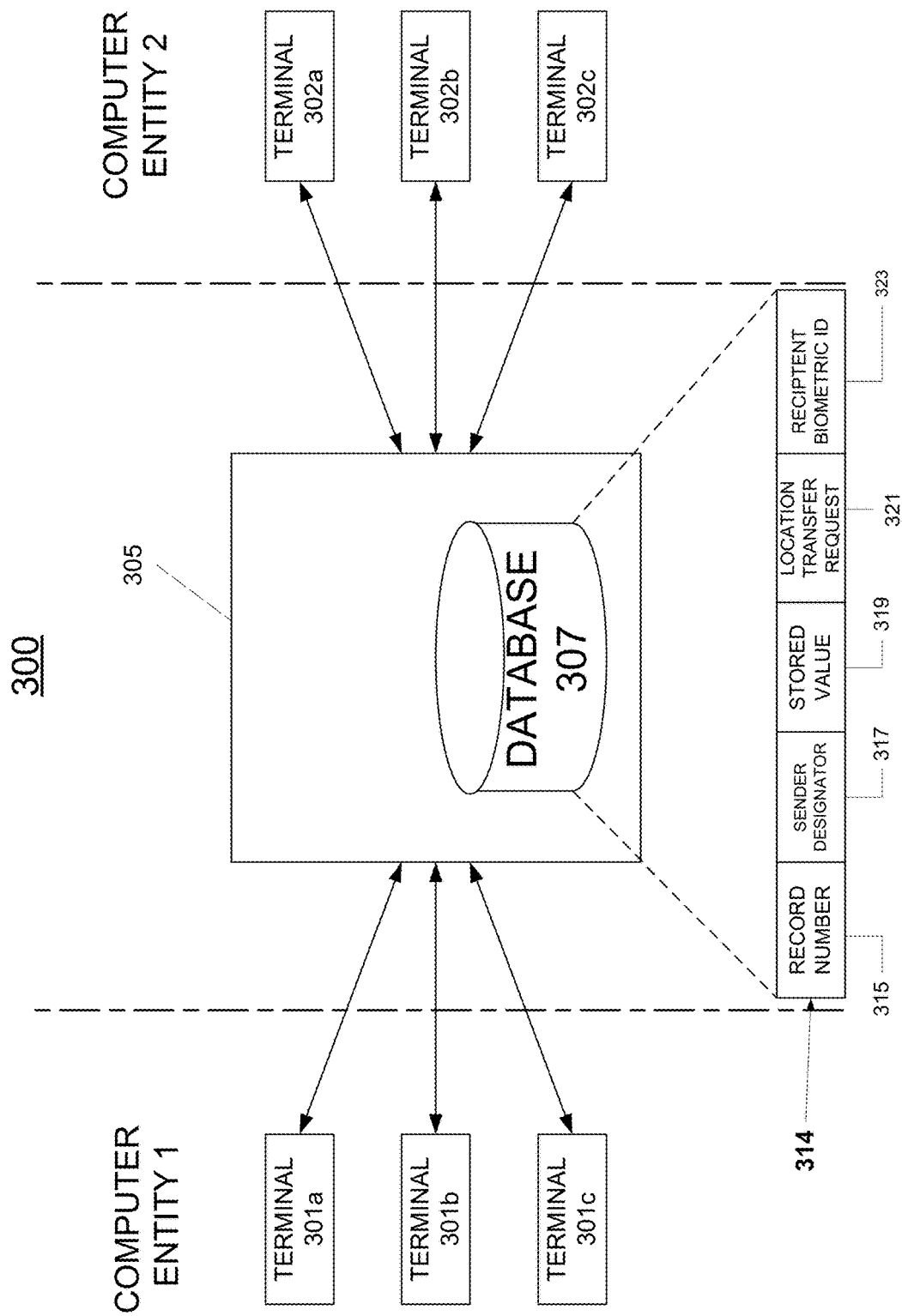
FIGS. 3A-3C are an illustrative functional block diagram of workstations, database and servers that may be used to implement the processes and functions of certain embodiments.
Figure 3B:
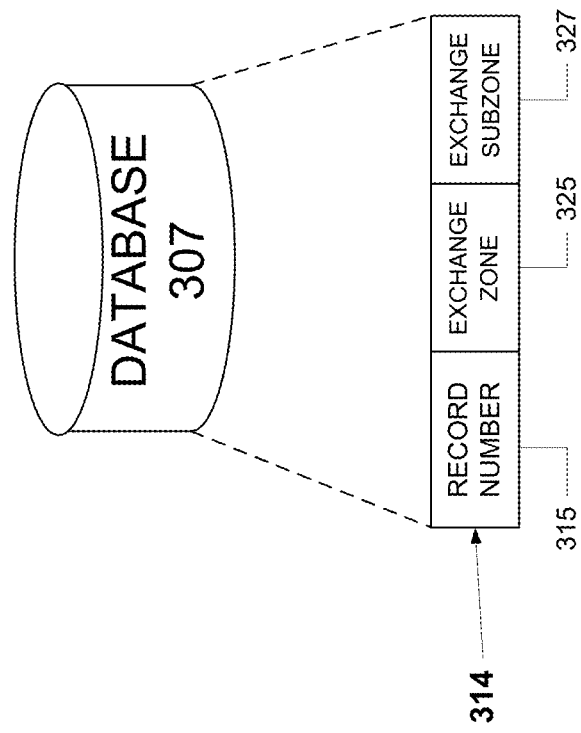
Figure 3C:
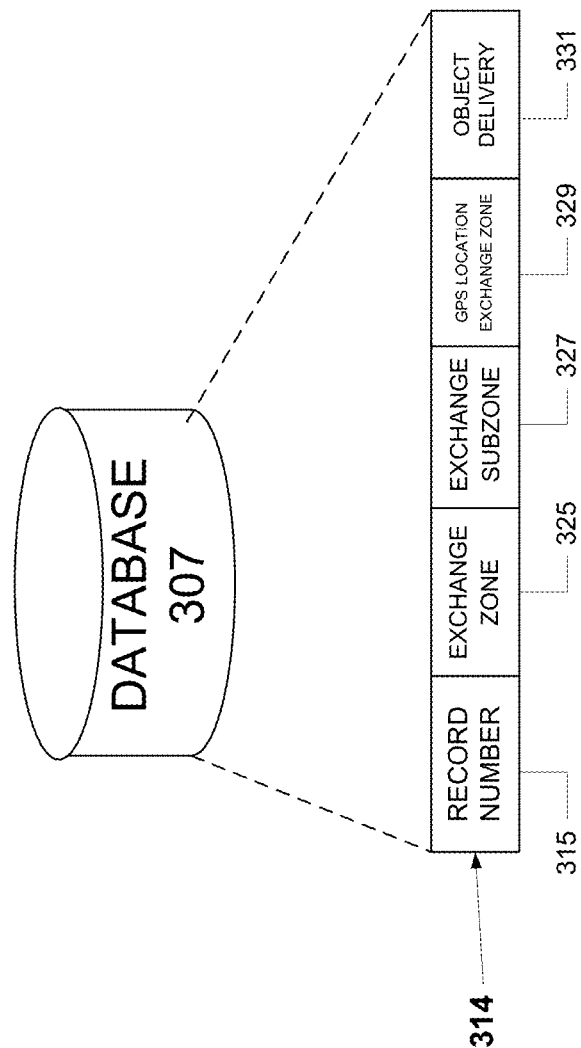

FIG. 3A-3C illustrate an example of representative infrastructure according to some embodiments in the disclosure. The different entity users 301a-301c (such as vendors, patrons), via terminals/workstations, electronically communicates with a plurality of different users (such as, purchasers, patrons) devices 302a-302c, through the electronic exchange logistics processing system 300 including server 305 and electronic database 307. In one embodiment, users execute commands with terminals/workstations to exchange information with the processing system 300 such that the identity of the users are shielded from each other. These terminals may be standard personal computers as are known in the art. In alternative embodiments, the users may use hand-held or other portable electronic devices as known in the art to communicate with the system 300.

The system 300 includes, for example and without limitation, server 305. Server 305 may include a mail server, which may be used to receive and send data via email or over the Internet 131. The system 300 may use various attribute data in the Electronic Data Interchange (EDI) format for electronic tracking of specific data as discussed in the foregoing. Server 305 can process an EDI messages sent through the exchange system 300 to improve computer processing and add functionally to electronic logistical tracking systems thereby bring new tangible improved electronic tracking functions to the technology area of transactions for exchange zone(s). A user (301a-301c and 302a-302c) may securely register to system 300 via a website URL registration service, an in-person registration service, a mail-in registration service, and/or some other registration service. A biometric device system may be included to allow for scanning of an iris of the user, retina scan, face recognition, and/or other types of biometric identification and authentication, including fingerprint scan analysis.

FIGS. 3A-3C are merely illustrative and the number of, users and/or user terminals, servers and databases is not in any way limited. Furthermore, although various embodiments are described in the context of a single system, one of ordinary skill in the art may appreciate that the described functionality may be implemented across multiple systems. Moreover, a web site may be mirrored at additional systems in the network and, if desired, one or more management systems or other computer resources may be used to facilitate various functions. The computer program at the system 300 includes appropriate screen routines for generating a set of screens that together comprise a graphical user interface for the site.

The system 300 can provide messages in the communication cycle in an authenticated format, secure for each user that would be invited or authorized to be a part of the secure data tracking exchange. For example, an IPSEC circuit is commonly to pertain to IP Security, a set of protocols to support secure exchange of packet at the IP layer in a TCP/IP network system. IPSEC systems have been deployed widely to implement Virtual Private Networks (VPNs). Under an IPSEC system, at least two encryption modes are supported: Transport and Tunnel. Transport mode encrypts only the payload portion of each packet, but leaves the header. The Tunnel mode encrypts both the header and the payload. On the receiving side, an IPSEC-compliant device decrypts each packet. The methods and features recited herein further may be implemented through any number of non-transitory computer readable media that are able to store computer readable instructions. Examples of non-transitory computer readable media that may be used include RAM, ROM, EEPROM, flash memory or other memory technology, CD-ROM, DVD, or other optical disc storage, magnetic cassettes, magnetic tape, magnetic storage and the like.

According to some aspects of the disclosure, a centralized system 300 provides various users efficiency for electronic processing transactions and for electronic logistics tracking and delivery of a product 501 shipped (see FIG. 5) to the designated exchange zone for the recipient user. A shipping container 501 may include an RFID tracking device 500. RFID Radio frequency identification ("RFID") technologies use radio waves, microchips, and microantennas to read data stored in non-transitory computer readable memory, such as RAM, ROM, EEPROM, flash memory or other memory technology. RFID technologies use Machine-to-Machine ("M2M") transmissions, which refer to direct communications between machines, such as a microchip computer readable memory, and a microchip memory scanner. In one construction, the exchange system 300 provides electronic messaging back and forth that inputs requests for selective location designation data retrieved from the RFID device (see FIG. 4). RFID tracking device 500 could be a QR code device, such as a computer machine-readable optical label that contains selective information or link to a URL about the container 501 to which it is attached thereto.

Referring to FIGS. 3A-3B, in one aspect, a first patron (e.g., recipient user) decides to acquire an article of manufacture (AOM) from a second patron (e.g., sender user) via the exchange system 300 as discussed in the foregoing. The system 300 may use various attribute data in the Electronic Data Interchange (EDI) format. In one implementation, the EDI message can use, for example, IPSEC circuitry for secure encrypted communications. The EDI messages can be electronically processed according any number of formats and data sequences. In one case, the EDI format and payload, may include an record number 315 (such as, a transaction identification), a sender user ID attribute 317 (optionally, sender biometric data identification), a stored value transfer amount attribute 319, and location transfer attribute data 321, and recipient-user attribute data 323 (e.g., recipient biometric data). The stored value transfer attribute data 319 pertains to the exchange value of the transaction between the first patron and second patron who acquires the article of manufacture. The location transfer attribute data 321 pertains to a designated location to transfer to the next processing location, such as S1 in FIG. 4. The recipient-user attribute data 323 (e.g., biometric data). In the EDI format and payload, the "attribute data" may include ASCII characters in computer readable form or binary complied data, such as biometric data. The ASCII characters or binary data can be manipulated in the software of system 300.

Figure 4:
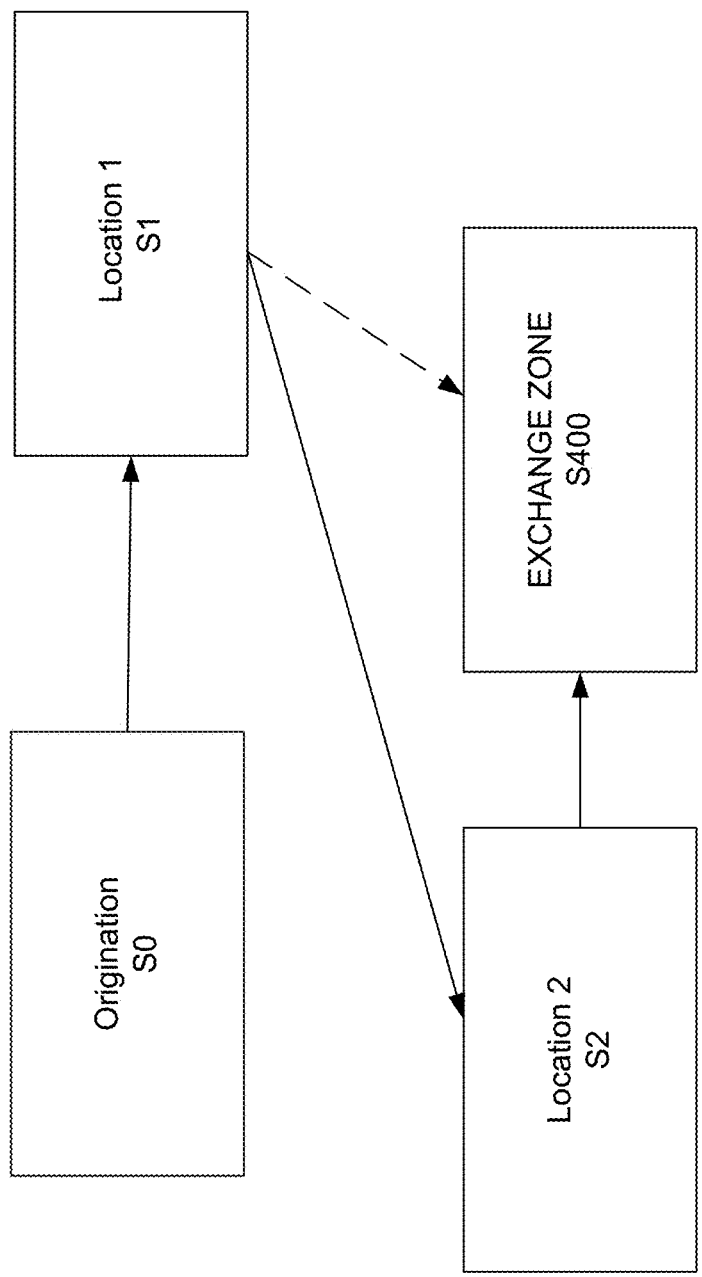
FIG. 4 is an example flow chart of an illustrative method for in accordance with at least one aspect of the present disclosure.
Figure 5:
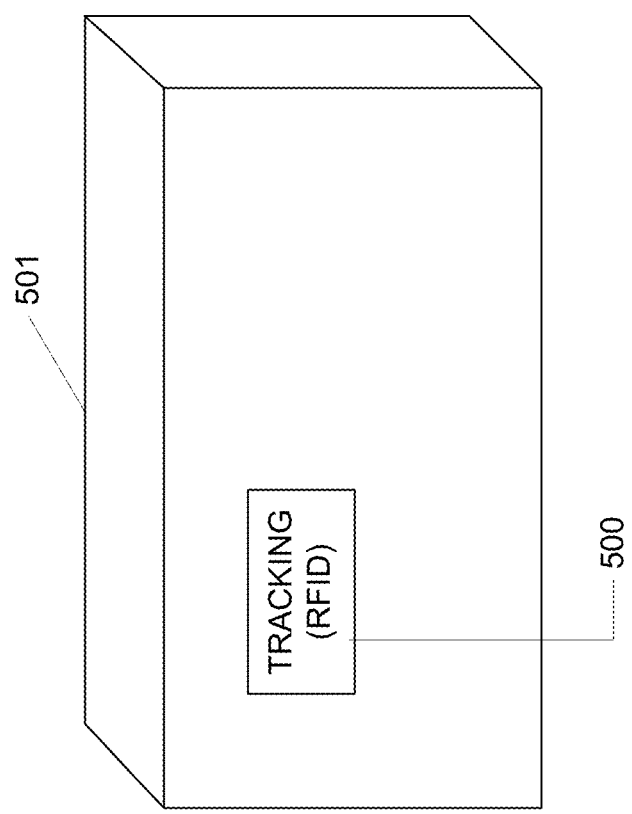
FIG. 5 is a schematic diagram of a logistical device with a data tracking device in accordance with at least one aspect of the present disclosure.

The steps that follow in the FIG. 4 may be implemented by one or more of the components in FIGS. 1, 2 and 3A-3B and/or other components, including other computing devices. Referring to FIG. 4, in a general overview, system 300 electronically maintains a plurality of electronic records for users associated with an entity system and a second entity system in a computer readable electronic database 121. In such an example, the separate record data attributes 500 may be stored within a non-transitory computer readable memory/database, such as memory 115 and/or RAM 105 in FIG. 1 or electronic database 307 of FIGS. 3A-3B. A user with device 302a-302c electronically contacts exchange system 300 to acquire an article of manufacture (AOM) from another user with device 301a-301c. For the exchange of the AOM, a stored value, such as store value attribute 316 is processed electronically via a digital disbursement computer readable process via electronic stored value transfer (ESVT) and/or Automated Clearing House information technology including a secured encrypted identity linked to the user records. In one construction, the processing system 300 may disburse the stored value to any stored value memory location determined to be eligible for using the most effective (determine to be either cost or time) transfer capabilities.

Figure 6:
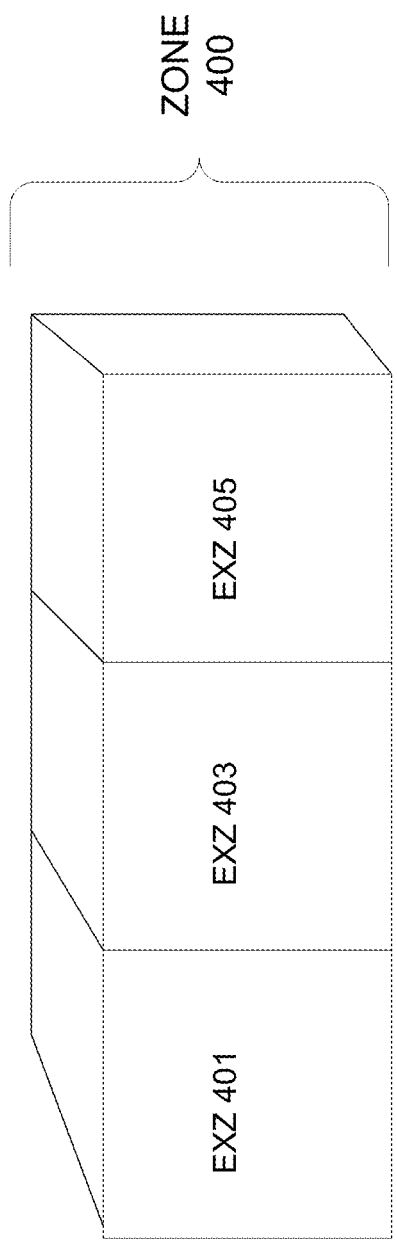
FIG. 6 is an example block diagram of an illustrative exchange zone environment providing for secure exchange processing in accordance with at least one aspect of the present disclosure.
Figure 7:
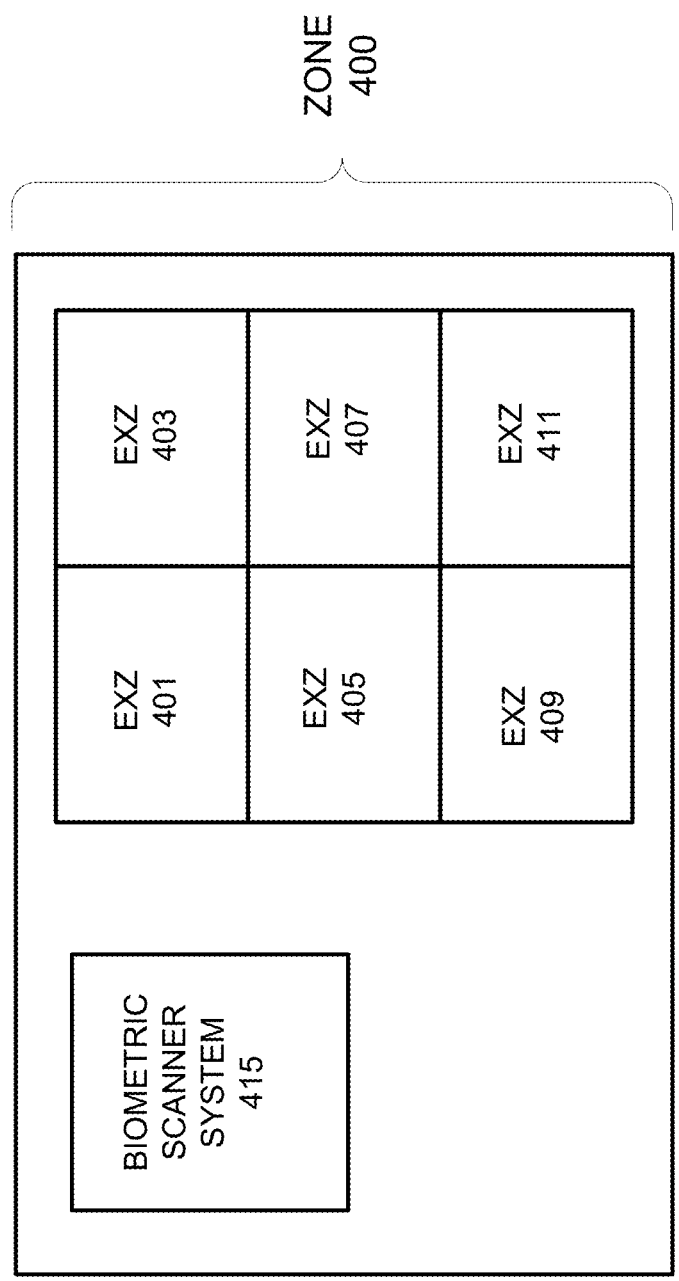
FIG. 7 is an example block diagram of an illustrative exchange zone environment for identifying an individual and providing for secure exchange processing in accordance with at least one aspect of the present disclosure.

A temporary virtual record 314 with EDI data payload including a transaction record attribute 315, sender user ID attribute 317, and a location transfer request attribute 321 for designating a processing location (e.g., S1, S2, S400 of FIG. 4) of a product is generated by the exchange computer system 300. In one construction, a temporary virtual record with virtual sub-records may be electronically linked to the record number attribute 315. Next, a step includes electronically via a secure computer-based data communications network, receiving EDI data payload representative of the transaction record attribute 315 and the location transfer request attribute 321 and exchange zone attribute 325. It is noted that the exchange zone attribute 325 designates a secure exchange zone (or exchange zone center) for the users physically obtain the product once, it is delivered as shown in FIGS. 6 and 7. In the computer processing flow, responsive to the exchange zone attribute 325, the processing logic includes a step of transmitting, via the computer-based data communications network, EDI data payload representative of a downstream processing for the exchange subzone attribute 327 as shown in FIG. 3B.

The steps that follow in FIG. 4 can be implemented to include a computer readable transaction history or log of the status within process flows that can be maintained or otherwise stored within a memory/database, such as memory 115 and/or RAM 105 in FIG. 1 or electronic database 307 of FIGS. 3A-3C. In one construction, the steps that follow in the FIG. 4 can be implemented where the vendor, customer or other entity can receive inquiries, via an automatic push notification or a report that sends to the authorized inquirer an electronic mail, text messaging via Short Messaging Service (SMS) component of phone, web, or mobile communication systems, using standardized communication protocols that allow the exchange of short text messages between fixed line or mobile phone devices. In another manner, the customer or entities can receive inquiries via a pull format where the inquirer initiates the query at various steps and the notification can be electronic mail or Short Messaging Service technology for cellular phones.

Referring to FIG. 4 process flow of system 300, the various items in Steps S0-S2, S400 are electronic logically via computer readable instructions linked to electronic attribute data for EDI message processing via system 300. A user executes a transaction to acquire a product 501 by means of the exchange system 300 as discussed in the foregoing. The system 300 may then employ selective attribute data in the Electronic Data Interchange (EDI) format. For example, in Step S0, a temporary virtual record 314 is created in the memory/database 307 with at least one record transaction identifier 315, and a sender user ID attribute 317, and a location transfer attribute data 321. A stored value transfer attribute 319 and a recipient user biometric ID attribute 323 can be optionally provided in the temporary virtual record 314. Still referring to Step S0, the system 300 can determine whether an RFID device 500 is provided to a product 501 for subsequent processing in the logistical chain and delivery in the exchange zone environment 400. It is noted that the temporary virtual record 314 is saved until the final delivery of the product 501, then the record 314 is deleted from memory of system 300. That is, temporary virtual record 314 is created by system 300 for the purpose of transferring the product 501 from origination to designation without the users discovering the identity of each other in the exchange zone environment 400.

In Step S1, the product 501 arrived at location 1. The location 1 includes an RFID scanner or antenna thereon. At location 1, the product 501 is identified via "reading" the RFID device 500 and contents therein. Referring to FIG. 3B, the system 300 determines the record number or transaction id 315, then determines whether to send product 501 to location 2 from in transfer location attribute 321. Further in Step S1, the transfer mode attribute 327 can be determined for transferring the product 501 to the next location. In Step S2, at location 2, the product 501 is identified via "reading" the RFID device 500 and contents therein.

In Step S400, the product 501 is transferred to its designated secure exchange location in exchange zone attribute 325, and in further details via exchange sub-zone attribute 327. Further in step S400, for example, the recipient user is provided with an automatic push notification of the exchange physical location address, and exchange sub-zone via an electronic mail, text messaging via Short Messaging Service (SMS) component of phone, web, or mobile communication systems, using standardized communication protocols that allow the exchange of short text messages between fixed line or mobile phone devices. At the exchange zone environment 400, the individual user may be identified based upon the scanned iris from a biometric device 415. Data representative of a scanned iris of a user desiring to make an exchange is provided to the system 300. In such a situation, as a patron enters the exchange location (e.g., exchange zone), an iris scanning system may be configured to capture the iris of the individual. Upon entry, a camera may passively capture the iris of the user. The system identifies and authenticates the individual. Such a transaction acts as an authorization to allow entry or automated entry of patron to the exchange location. The exchange zone location can be secure location, such as in a banking location, for example. In an alternative processing step of S400, the recipient user is provided with an automatic push notification of the exchange physical location address only, and not the exchange sub-zone for pick-up. In this alternative construction, it is noted that the exchange sub-zone is revealed to the recipient user when that user is authenticated at the exchange zone environment 400 as explained below.

FIG. 7 is an example block diagram of an illustrative exchange zone environment 400 for identifying an individual and providing for secure exchange processing in accordance with at least one aspect of the present disclosure. FIG. 7 illustrates an in-person exchange for a product at a designated exchange zone 400, which occurs between individual users as noted in the foregoing. A biometric device system 415, such as camera, is shown having an optical field of view that encompasses the area in front of the exchange zone environment 400 and is capable of capturing an image of the iris of the individual recipient. Biometric device 415 may be any of a number of different image capturing devices with a focal length capable of capturing clear images of the iris of an individual purchaser within its field of view. In another construction, biometric device system 415 may be allow for scanning of a retina, face recognition, voice and/or fingerprint scan analysis and/or other types of biometric identification and authentication.

With the captured biometric digital information, a computer, local to or remote from, the exchange zone environment 400 may receive the captured biometric data for processing and identification of the user via system 300 stored data comparison with biometric attribute 323. Any of a number of different program applications may be utilized with respect to hardware, firmware, and/or software for matching a captured biometric data with stored biometric data attribute 323 in system 300. Once a match is found, the user may be prompted by the exchange zone 400 to open their exchange sub-zone EXZ401-EXZ411. In various constructions, exchange sub-zone EXZ401-EXZ411 may be physical containers for holding a product 501 therein. The sub-zone EXZ401-EXZ411 may include a physical door that can be automatically opened or unlocked upon entry of an access code or scanned biometric data of the recipient user. In one construction of the exchange zone environment 400, a surrounding scan can be accomplished via a camera in the biometric device 415 or in another location to ensure only an authorized person or persons are in the secure area around the exchange zone environment. In another construction, each patron (sender and recipient) could be given a predetermined coded tag that is scanned when near the exchange zone perimeter area. In this construction, a coded tag would be a QR code, such as a computer machine-readable optical label that contains selective information or electronic link to system 300 to authorized entry.

In various constructions of the exchange zone environment 400, exchange sub-zone EXZ401-EXZ411 may be each connected to the networks depicted in FIG. 1 LAN 125, WAN 129 using the well-known protocols with a communications link between the computers such as TCP/IP, Ethernet, FTP, HTTP. As such, exchange zone 400 may be connected a node on a TCP/IP network as a separate domain and exchange sub-zone EXZ401-EXZ411 be a connected in sub-nodes with associated network devices therein. In such configuration, one or more wireless proximity-type sensors (such as, infrared or radio frequency wireless) may be included within the container void to determine the presence of an object or product in the void of the container. Proximity sensors detect the presence of nearby objects without any physical contact. The sensors may be connected to the networks LAN 125, WAN 129 depicted in FIG. 1 or other networks or directly to system 300 via such networks, such as the Internet 131. Once the object is removed from the exchange sub-zone EXZ401-EXZ411, a non-presence signal is generated and converted into a digital binary EDI payload having an object delivery data attribute 331 that is transmitted back to the system 300 to complete the indication or confirmation of the transfer of the subject article of manufacture. In one construction, the stored value transfer attribute data 319 is adjusted to only after system 300 receives the object delivery data attribute 331 indicating that the article of manufacture is no longer in the exchange zone 400. In yet another construction, the stored value transfer attribute data 319 is adjusted to only after system 300 receives the object delivery data attribute 331 indicating that the article of manufacture is no longer in the exchange zone 400 and the recipient user has been authenticated with biometric data attribute 323. In this way, the system 300 can verify remotely that the exchange of the article of manufacture has occurred and the stored value attribute 319 can be adjusted by the value of the exchange.

In alternative constructions of the exchange zone environment 400, the environment 400 may be a mobile location, instead of physical permanent address, such as, vehicle truck or storage container provided with electronic networking equipment. In such a construction, the user may be provided with a GPS location (e.g., GPS location data attribute 329 in FIG. 3C) to determine the exchange location. In an alternative construction of the mobile exchange zone, the exchange zone environment 400 may be movable over a period of a predetermined time, such as daily, weekly, bimonthly, monthly, or on-demand. In one such a configuration, a GPS location can be linked to one postal zip code one month and then a randomly selected different postal zip code for another month or at the next physical exchange between the sender and recipient. The GPS location data attribute 329 would have the longitude and latitude of the location to linked to a mapping application. In other alternative constructions of the exchange zone environment 400, the recipient user may be contact system 300 for a return authorization data to return to the product 501 to the sender. In such as case, the system 300 can provide the recipient user code to allow the exchange sub-zone EXZ401-EXZ411 to be designated for a return. Then once the product 501 is provided in the designated exchange zone, the notification can be provided to a shipping company to retrieve the product 501 from the exchange zone, such as one of EXZ401-EXZ411.

While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

The invention claimed is:

1. An electronic computer implemented tracking method for an article of manufacture, comprising:
    generating a virtual record with EDI data payload including a transaction record attribute, a location transfer request attribute for designating a transfer location of an article of manufacture, and a recipient user biometric ID attribute;
    electronically via data communications IPSEC network tunnel, transmitting EDI data payload representative of the transaction record attribute and the location transfer request attribute; and
    responsive to the location transfer request attribute, transmitting, via the computer-based data communications network, EDI data payload representative of an exchange zone attribute for designating a physical zone having an TCP/IP address for exchanging said article of manufacture; said physical zone TCP/IP address having data representative of a movable and random GPS location data attribute based on at least one randomly generated zone improvement code;
    detecting a presence of the article of manufacture in the physical zone via an infrared sensor being connected to the computer-based data communications network and providing a signal to unlock a door in the physical zone associated with said article of manufacture; and
    generating a non-presence signal for the article of manufacture within the physical zone and converting the non-presence signal into a digital binary EDI payload having an object delivery data attribute to indicate of the transfer of the article of manufacture from the physical zone.

2. The method of claim 1, further comprising a step of scanning a RFID associated with the article of manufacture associated with the transaction record attribute.

3. The method of claim 1, further comprising a step of transmitting, via the computer-based data communications network, EDI data payload representative an exchange sub-zone attribute associated with the transaction record attribute.

4. The method of claim 1, further comprising a step of transmitting, via the computer-based data communications network, EDI data payload representative of a sender user biometric ID attribute.

5. The electronic computer implemented tracking method for an article of manufacture according to claim 4, wherein location transfer request attribute includes a mobile GPS attribute.

6. The electronic computer implemented tracking method for an article of manufacture according to claim 1, wherein location transfer request attribute includes a mobile GPS attribute.

\* \* \* \* \*